United States Patent
Moschella

[19]

[11] Patent Number: 5,967,022
[45] Date of Patent: Oct. 19, 1999

US005967022A

[54] COOKING SYSTEM

[76] Inventor: Andrea Moschella, 326 Washington St. #2 A, Hoboken, N.J. 07030

[21] Appl. No.: 09/262,176

[22] Filed: Mar. 4, 1999

[51] Int. Cl.[6] ............................. A47J 37/00; A47J 37/10; B25D 25/28
[52] U.S. Cl. .............................. 99/339; 99/422; 99/448; 99/645; 220/731; 220/912
[58] Field of Search ...................... 99/339, 340, 422–425, 99/426, 448, 449, 645; 126/373, 369, 390, 299 C; 220/252, 287, 731, 553, 912, 608, 366.1, 369, 370, 661, 663; D7/357, 361

[56] References Cited

U.S. PATENT DOCUMENTS

| D. 383,354 | 9/1997 | Nassar | D7/357 |
|---|---|---|---|
| 867,086 | 9/1907 | Sullivan | 126/373 |
| 2,515,617 | 7/1950 | Tilford | 126/390 |
| 2,568,637 | 9/1951 | Jardim | 99/645 |
| 2,664,169 | 12/1953 | Misener et al. | 99/339 |
| 3,777,653 | 12/1973 | Carruth | 99/339 |
| 3,793,936 | 2/1974 | Wills | 99/339 |
| 4,495,861 | 1/1985 | Jacks et al. | 99/422 |
| 5,339,728 | 8/1994 | Marchwiak et al. | 220/912 X |
| 5,402,714 | 4/1995 | Deneault et al. | 99/448 X |
| 5,481,967 | 1/1996 | Chen | 99/645 X |
| 5,511,466 | 4/1996 | Dzibinski | 99/339 |
| 5,724,885 | 3/1998 | Uy | 99/422 X |

*Primary Examiner*—Timothy F. Simone

[57] ABSTRACT

A cooking system for cooking several different food items at once over a single heat source. The cooking system includes a pan with a base panel, a peripheral sidewall upwardly extending from the base panel, and a handle extending from the peripheral sidewall. An insert rests on an upper edge of the peripheral sidewall of the pan. The insert comprises an upper panel and an abutting wall downwardly extending from a rear edge of the upper panel and engaging the base panel of the pan. The abutting wall is designed for confining food to an area of the pan not covered by the insert. The insert has a pair of depressions therein designed for receiving food therein.

12 Claims, 4 Drawing Sheets

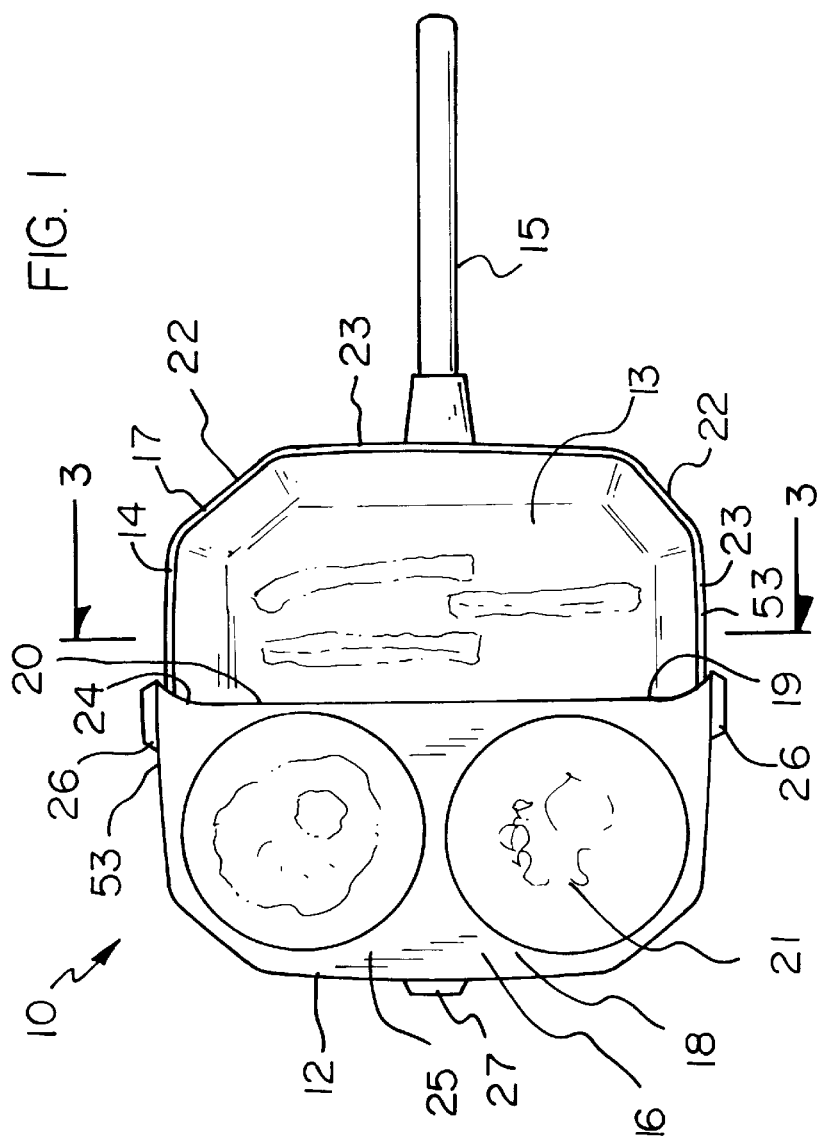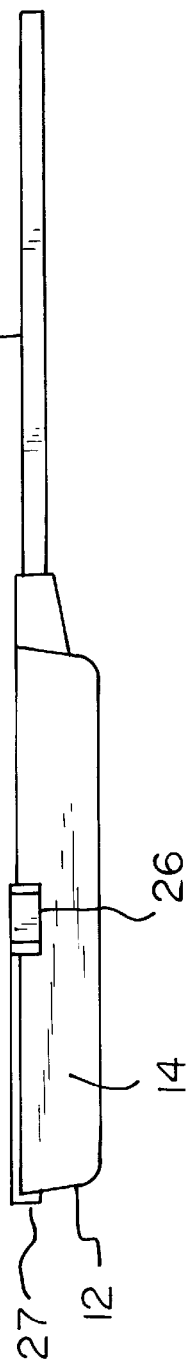

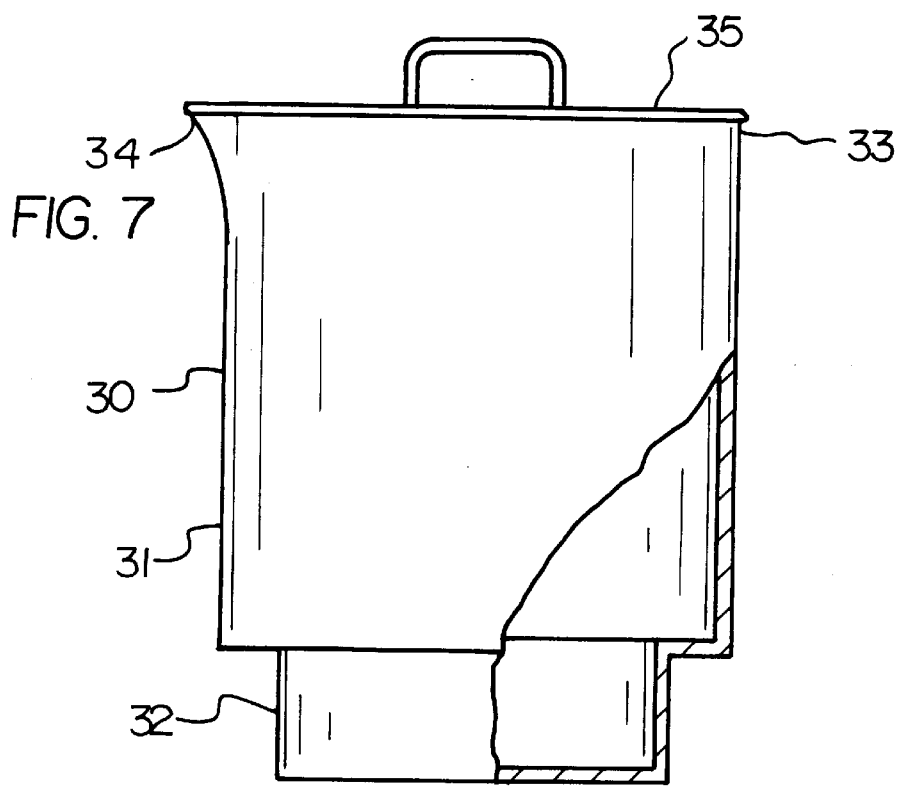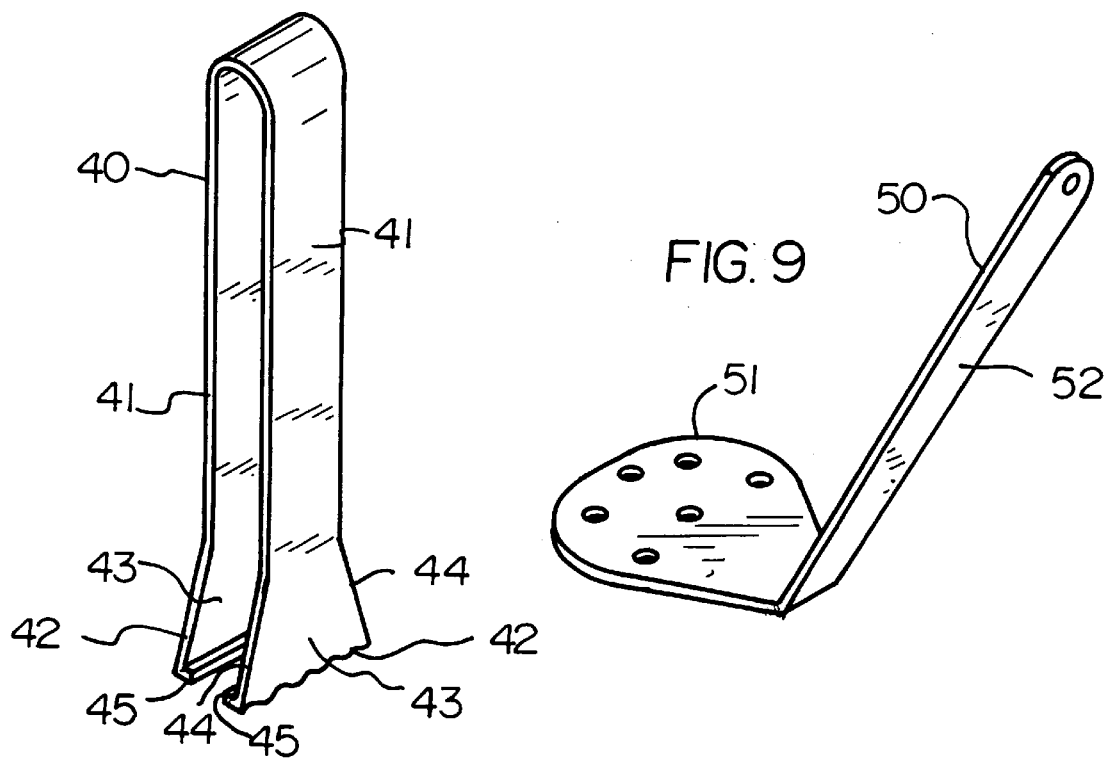

COOKING SYSTEM

BACKGROUND OF THE INVENTION

1. Field of the Invention

The present invention relates to cooking devices and utensils and more particularly pertains to a new cooking system for cooking several different food items at once over a single heat source.

2. Description of the Prior Art

The use of cooking devices and utensils is known in the prior art. More specifically, cooking devices and utensils heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,515,617; U.S. Pat. No. 867,086; U.S. Pat. No. Des. 383,354; U.S. Pat. No. 5,339,728; U.S. Pat. No. 4,495,861; and U.S. Pat. No. 5,402,714.

While these devices fulfill their respective, particular objectives and requirements, the aforementioned patents do not disclose a new cooking system. The inventive device includes a pan with a base panel, a peripheral sidewall upwardly extending from the base panel, and a handle extending from the peripheral sidewall. An insert rests on an upper edge of the peripheral sidewall of the pan. The insert comprises an upper panel and an abutting wall downwardly extending from a rear edge of the upper panel and engaging the base panel of the pan. The abutting wall is designed for confining food to an area of the pan not covered by the insert. The insert has a pair of depressions therein designed for receiving food therein.

In these respects, the cooking system according to the present invention substantially departs from the conventional concepts and designs of the prior art, and in so doing provides an apparatus primarily developed for the purpose of cooking several different food items at once over a single heat source.

SUMMARY OF THE INVENTION

In view of the foregoing disadvantages inherent in the known types of cooking devices and utensils now present in the prior art, the present invention provides a new cooking system construction wherein the same can be utilized for cooking several different food items at once over a single heat source.

The general purpose of the present invention, which will be described subsequently in greater detail, is to provide a new cooking system apparatus and method which has many of the advantages of the cooking devices and utensils mentioned heretofore and many novel features that result in a new cooking system which is not anticipated, rendered obvious, suggested, or even implied by any of the prior art cooking devices and utensils, either alone or in any combination thereof.

To attain this, the present invention generally comprises a pan with a base panel, a peripheral sidewall upwardly extending from the base panel, and a handle extending from the peripheral sidewall. An insert rests on an upper edge of the peripheral sidewall of the pan. The insert comprises an upper panel and an abutting wall downwardly extending from a rear edge of the upper panel and engaging the base panel of the pan. The abutting wall is designed for confining food to an area of the pan not covered by the insert. The insert has a pair of depressions therein designed for receiving food therein.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new cooking system apparatus and method which has many of the advantages of the cooking devices and utensils mentioned heretofore and many novel features that result in a new cooking system which is not anticipated, rendered obvious, suggested, or even implied by any of the prior art cooking devices and utensils, either alone or in any combination thereof.

It is another object of the present invention to provide a new cooking system which may be easily and efficiently manufactured and marketed.

It is a further object of the present invention to provide a new cooking system which is of a durable and reliable construction.

An even further object of the present invention is to provide a new cooking system which is susceptible of a low cost of manufacture with regard to both materials and labor, and which accordingly is then susceptible of low prices of sale to the consuming public, thereby making such cooking system economically available to the buying public.

Still yet another object of the present invention is to provide a new cooking system which provides in the apparatuses and methods of the prior art some of the advantages thereof, while simultaneously overcoming some of the disadvantages normally associated therewith.

Still another object of the present invention is to provide a new cooking system for cooking several different food items at once over a single heat source.

Yet another object of the present invention is to provide a new cooking system which includes a pan with a base panel, a peripheral sidewall upwardly extending from the base panel, and a handle extending from the peripheral sidewall. An insert rests on an upper edge of the peripheral sidewall of the pan. The insert comprises an upper panel and an abutting wall downwardly extending from a rear edge of the upper panel and engaging the base panel of the pan. The abutting wall is designed for confining food to an area of the pan not covered by the insert. The insert has a pair of depressions therein designed for receiving food therein.

Still yet another object of the present invention is to provide a new cooking system that saves time in that only one pan needs to be cleaned, not three.

Even still another object of the present invention is to provide a new cooking system that saves energy in that several different food items are cooked over one heat source. This invention also saves space on the stove, permitting a user to use the other burners for other things.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic top view of a new cooking system according to the present invention.

FIG. 2 is a schematic side view of the present invention.

FIG. 7 is a schematic side view of a cooking pot of the present invention.

FIG. 8 is a schematic perspective view of tongs of the present invention.

FIG. 9 is a schematic perspective view of a spatula of the present invention.

DESCRIPTION OF THE PREFERRED EMBODIMENT

Figure 3:
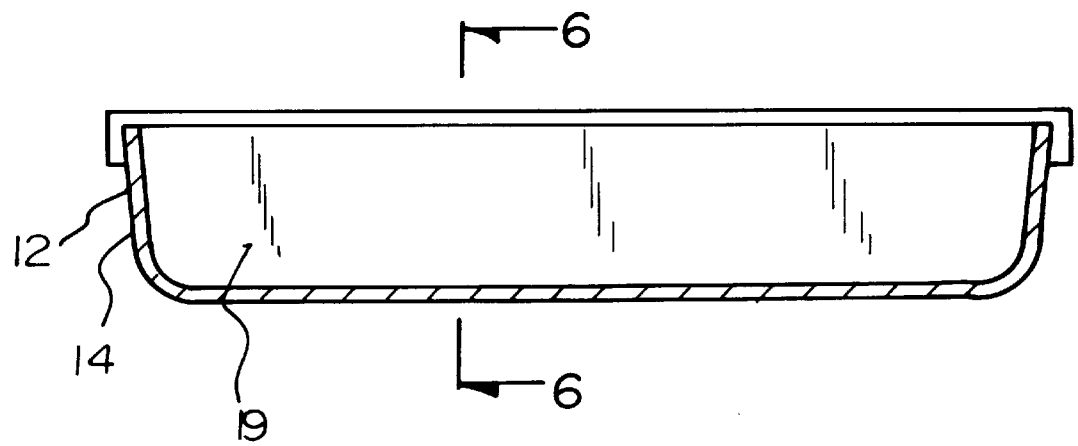
FIG. 3 is a schematic cross sectional view of the present invention taken from line 3—3 of FIG. 1.
Figure 4:
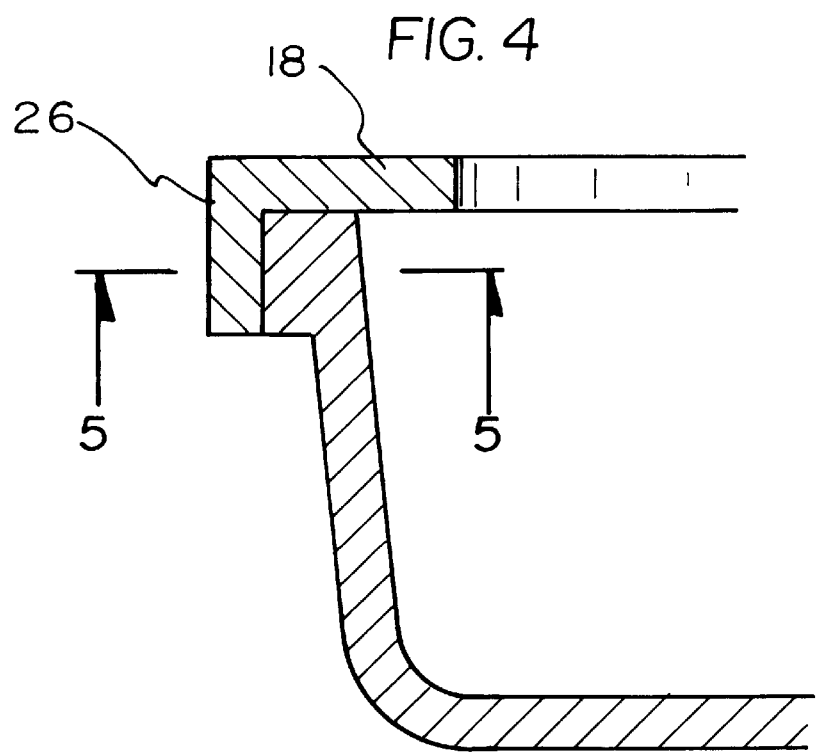
FIG. 4 is a schematic cross sectional view of the present invention.
Figure 5:
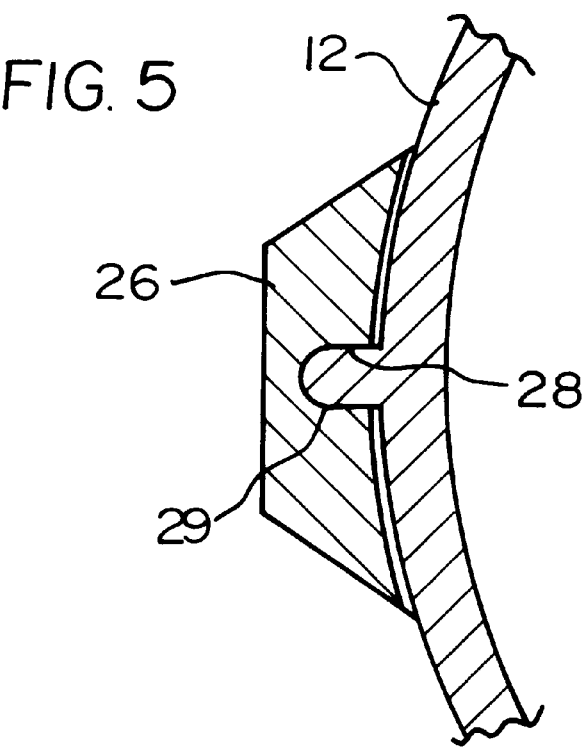
FIG. 5 is a schematic cross sectional view of the present invention taken from line 5—5 of FIG. 4.
Figure 6:
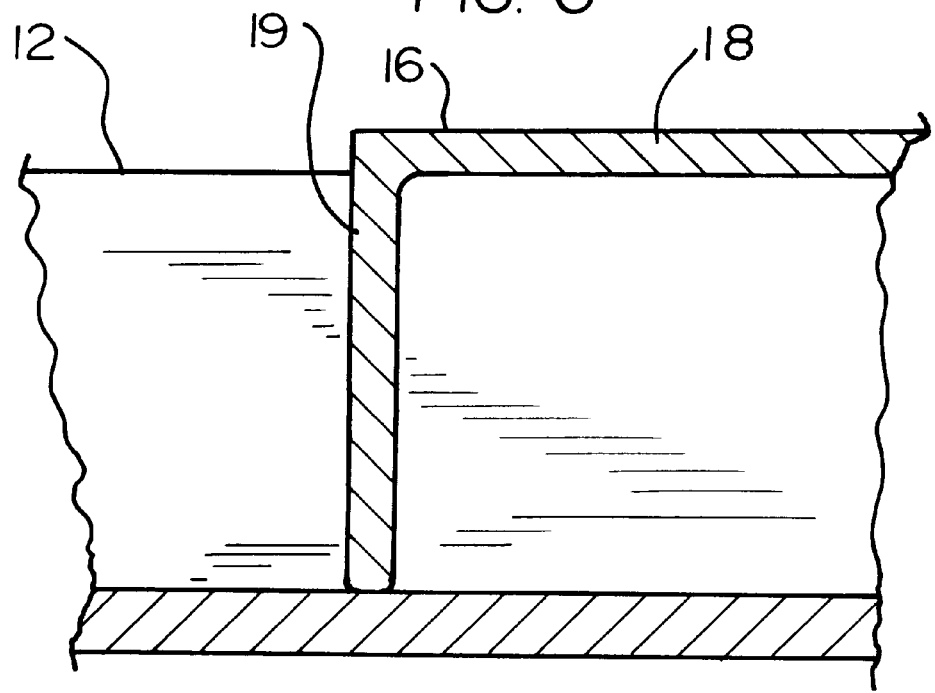
FIG. 6 is a schematic cross sectional view of the present invention taken from line 6—6 of FIG. 3.

With reference now to the drawings, and in particular to FIGS. 1 through 9 thereof, a new cooking system embodying the principles and concepts of the present invention and generally designated by the reference numeral 10 will be described.

As best illustrated in FIGS. 1 through 9, the cooking system 10 generally comprises a pan 12 with a base panel 13, a peripheral sidewall 14 upwardly extending from the base panel, and a handle 15 extending from the peripheral sidewall. An insert 16 rests on an upper edge 17 of the peripheral sidewall of the pan. The insert comprises an upper panel 18 and an abutting wall 19 downwardly extending from a rear edge 20 of the upper panel and engaging the base panel of the pan. The abutting wall is designed for confining food to an area of the pan not covered by the insert. The insert has a pair of depressions 21 therein designed for receiving food therein.

Preferably, the pan is generally rectangular with corner portions 22 and side portions 23 extending between the corner portions. Ideally, the corner portions are rounded. Also ideally, the side portions are arcuate bowing outwardly of the pan. The corner portions and side portions are curved to hold the food over the heat source, which is typically a round burner. Inner surfaces of the base panel and the sidewall may have a nonstick coating, such as TEFLON®, which resists adhesion of food thereto.

The insert is removable. Ideally, the abutting wall has curved opposite ends 24. The ends curving away from the upper panel so that there is no sharp corner formed by the abutting wall of the insert and the sidewall of the pan.

Preferably, the upper panel has a generally hemispherical outer edge 25 shaped to overlappingly engage the upper edge of the pan. The shape of the outer edge of the insert should be substantially similar to the upper edge of the pan so that there are no gaps through which heat could escape.

Also preferably, the depressions of the insert are generally circular. Inner surfaces of the depressions and the upper surface of the upper panel may have a nonstick coating such as TEFLON®.

Preferably, the insert has a pair of flaps 26 extending from rear ends of the outer edge and a third flap 27 extending centrally from the outer edge. Each of the flaps is designed for engaging an outer surface of the sidewall of the pan. The flaps maintain alignment of the insert on the upper edge of the pan.

Ideally, each of the flaps has a groove 28 extending into an inner surface of the flap. Three of the sides of the pan each have a tongue 29 extending centrally therefrom and inserted in a notch of the pan.

The cooking system may also include a generally cylindrical pot 30, preferably with an upper portion 31 and a lower portion 32. The lower portion is designed for insertion in one of the depressions of the insert. Ideally, an outer diameter of the upper portion is greater than an outer diameter of the lower portion.

An upper rim 33 of the pot defines an upper opening into the pot. The upper rim may have a spout 34. The pot has a lid 35 for closing the upper opening.

The cooking system may also include tongs 40 that have a pair of arms 41 pivotally coupled together at one end thereof. Free ends 42 of the arms have complementing grasping portions 43.

Preferably, opposite side edges 44 of each of the grasping portions taper away from each other towards the free ends of the arms. The tapering helps grasp food from the peripheral corners of the depressions.

Also preferably, the free ends of the arms each has an angled portion 45 extending towards the opposite arm generally perpendicular to the associated arm. The angled portions help grasp food items from the pot, pan, or insert.

The cooking system may also include a spatula 50 with a head portion 51 and a handle portion 52 extending at an obtuse angle from the head portion. Preferably, the head portion of the spatula is rounded. The curvature of the head portion is substantially equal to the curvature of each of the depressions of the insert. The head portion has a plurality of apertures through it.

An exemplary height of the pan is about ¾ inches from the upper edge of the sidewall to the lower surface of the base panel. An exemplary length and width of the pan is about 12 inches by 12 inches taken between central portions 53 of the upper edges of opposing sides of the pan. An exemplary length of the handle is about 8 inches. However, it is to be understood that the invention may be constructed in other dimensions as well.

In use, the insert is placed in the pan. The pan is placed over a heat source. Food is placed in the pan and food is placed in one or both of the depressions of the insert. The pot may be placed in one of the inserts instead of food. The spatula is used to add, mix, flip, and remove food from the pan and depressions of the insert. The tongs are used to add, mix, and remove food from the pot as well as to remove food from the depressions.

In an exemplary use, bacon could be cooked on the base panel of the pan while eggs are prepared in one of the depressions and hash browns in the other of the depressions. In this way, an entire breakfast may be cooked in the same apparatus. Since the eggs cook faster, they could be removed from the depression and coffee could be brewed in the pot, which would be placed in the now free depression.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A cooking system for cooking several food items over a single heat source, the system comprising:
   a pan having a base panel, a peripheral sidewall upwardly extending from said base panel, and a handle extending from said peripheral sidewall;
   said peripheral sidewall having a plurality of corner portions and a plurality of side portions extending between said corner portions;
   an insert resting on an upper edge of said peripheral sidewall of said pan, said insert comprising an upper panel and an abutting wall downwardly extending from a rear edge of said upper panel and engaging said base panel of said pan, said abutting wall being adapted for confining food to an area of said pan not covered by said insert; and
   said insert having a pair of depressions therein adapted for receiving food therein.

2. The cooking system of claim 1, wherein said abutting wall has curved opposite ends, said ends curving away from said upper panel.

3. The cooking system of claim 1, wherein said insert has a pair of flaps extending from rear ends of said outer edge and a third flap extending centrally from said outer edge, each of said flaps being adapted for engaging an outer surface of said sidewall of said pan, said flaps being for maintaining alignment of said insert on said upper edge of said pan.

4. The cooking system of claim 3, wherein each of said flaps has a groove extending into an inner surface of said flap, three of said sides of said pan each having a tongue extending therefrom and inserted in a notch of said pan.

5. The cooking system of claim 1, further comprising a pot adapted for insertion in one of said depressions of said insert.

6. The cooking system of claim 1, further comprising tongs having a pair of arms pivotally coupled together at one end thereof, free ends of said arms having complementing grasping portions.

7. The cooking system of claim 6, wherein opposite side edges of each of said grasping portions taper away from each other towards said free ends of said arms.

8. The cooking system of claim 6, wherein said free ends of said arms each having an angled portion extending towards the opposite arm generally perpendicular to the associated arm.

9. The cooking system of claim 1, further comprising a spatula having a head portion and a handle portion extending at an obtuse angle from said head portion.

10. The cooking system of claim 9, wherein said head portion of said spatula is rounded, the curvature of said head portion being substantially equal to a curvature of each of said depressions of said insert.

11. The cooking system of claim 5, further comprising tongs and a spatula, said tongs having a pair of arms pivotally coupled together at one end thereof, free ends of said arms having complementing grasping portions, said spatula having a head portion and a handle portion extending at an obtuse angle from said head portion.

12. A cooking system for cooking several food items over a single heat source, the system comprising:
   a generally rectangular pan having a base panel, a peripheral sidewall upwardly extending from said base panel, and a handle extending from said peripheral sidewall;
   said peripheral sidewall having a plurality of corner portions and a plurality of side portions extending between said corner portions;
   wherein said corner portions are rounded;
   wherein said side portions are arcuate;
   inner surfaces of said base panel and said sidewall having a nonstick coating;
   an insert resting on an upper edge of said peripheral sidewall of said pan, said insert comprising an upper panel and an abutting wall downwardly extending from a rear edge of said upper panel and engaging said base panel of said pan, said abutting wall being adapted for confining food to an area of said pan not covered by said insert;
   wherein said abutting wall has curved opposite ends, said ends curving away from said upper panel;
   said upper panel having a generally hemispherical outer edge shaped to overlappingly engage said upper edge of said pan;
   said insert having a pair of generally circular depressions therein adapted for receiving food therein;
   inner surfaces of said depressions having a nonstick coating;

said insert having a pair of flaps extending from rear ends of said outer edge and a third flap extending centrally from said outer edge, each of said flaps being adapted for engaging an outer surface of said sidewall of said pan, said flaps being for maintaining alignment of said insert on said upper edge of said pan;

each of said flaps having a groove extending into an inner surface of said flap;

three of said sides of said pan each having a tongue extending therefrom and inserted in a notch of said pan;

a generally cylindrical pot having an upper portion and a lower portion, said lower portion being adapted for insertion in one of said depressions of said insert;

an outer diameter of said upper portion being greater than an outer diameter of said lower portion;

an upper rim of said pot defining an upper opening in to said pot, said upper rim having a spout;

said pot having a lid for closing said upper opening;

tongs having a pair of arms pivotally coupled together at one end thereof, free ends of said arms having complementing grasping portions;

opposite side edges of each of said grasping portions tapering away from each other towards said free ends of said arms;

said free ends of said arms each having an angled portion extending towards the opposite arm generally perpendicular to the associated arm;

a spatula having a head portion and a handle portion extending at an obtuse angle from said head portion;

said head portion of said spatula being rounded, the curvature of said head portion being substantially equal to the curvature of each of said depressions of said insert; and said head portion having a plurality of apertures therethrough.

\* \* \* \* \*